United States Patent [19]

Rupp, III

[11] Patent Number: 4,889,064
[45] Date of Patent: Dec. 26, 1989

[54] SPORTFISHING OUTRIGGER DEVICES

[75] Inventor: Herbert E. Rupp, III, Stuart, Fla.

[73] Assignee: Rupp Marine, Inc., Port Salerno, Fla.

[21] Appl. No.: 282,618

[22] Filed: Dec. 12, 1988

[51] Int. Cl.⁴ ............................................. B63B 35/14
[52] U.S. Cl. ..................................... 114/89; 114/255
[58] Field of Search .................................. 114/89–97, 114/100–102, 109, 111, 221 R, 223, 255; 403/115, 112, 119, 122, 123, 142, 143, 160, 361, 370, 365, 367, 368, 375, 381

[56] References Cited

U.S. PATENT DOCUMENTS

| 288,153 | 11/1883 | Avery | 114/92 |
|---|---|---|---|
| 2,774,809 | 12/1956 | Burkhart | 114/92 |
| 3,312,020 | 4/1967 | Schuster | 114/90 |
| 3,986,474 | 10/1976 | King | 114/90 |
| 4,230,060 | 10/1980 | McCoy | 114/102 |
| 4,632,050 | 12/1986 | Rupp | 114/255 |

FOREIGN PATENT DOCUMENTS 1212517 11/1989 United Kingdom ................. 114/92

Primary Examiner—Joseph F. Peters, Jr.
Assistant Examiner—Clifford T. Bartz
Attorney, Agent, or Firm—Carroll F. Palmer

[57] ABSTRACT

Improved spreader assemblies for cable trussed masts of sportfishing boat outriggers have spreader arms formed of straight metal tubing and a cable guide through which one of the cables passes is removably fitted into the outboard end of each spreader arm. There is a spreader arm holder that includes a collar sized to encircle the mast and four bores in such collar are positioned in a common transverse plane spaced 90° apart in which the inboard ends of the spreader arms are retained. A lug extends laterally from the collar at each collar bore location creating an extension of the respective bore to provide support to the inboard end of the spreader arm inserted in such bore.

8 Claims, 1 Drawing Sheet

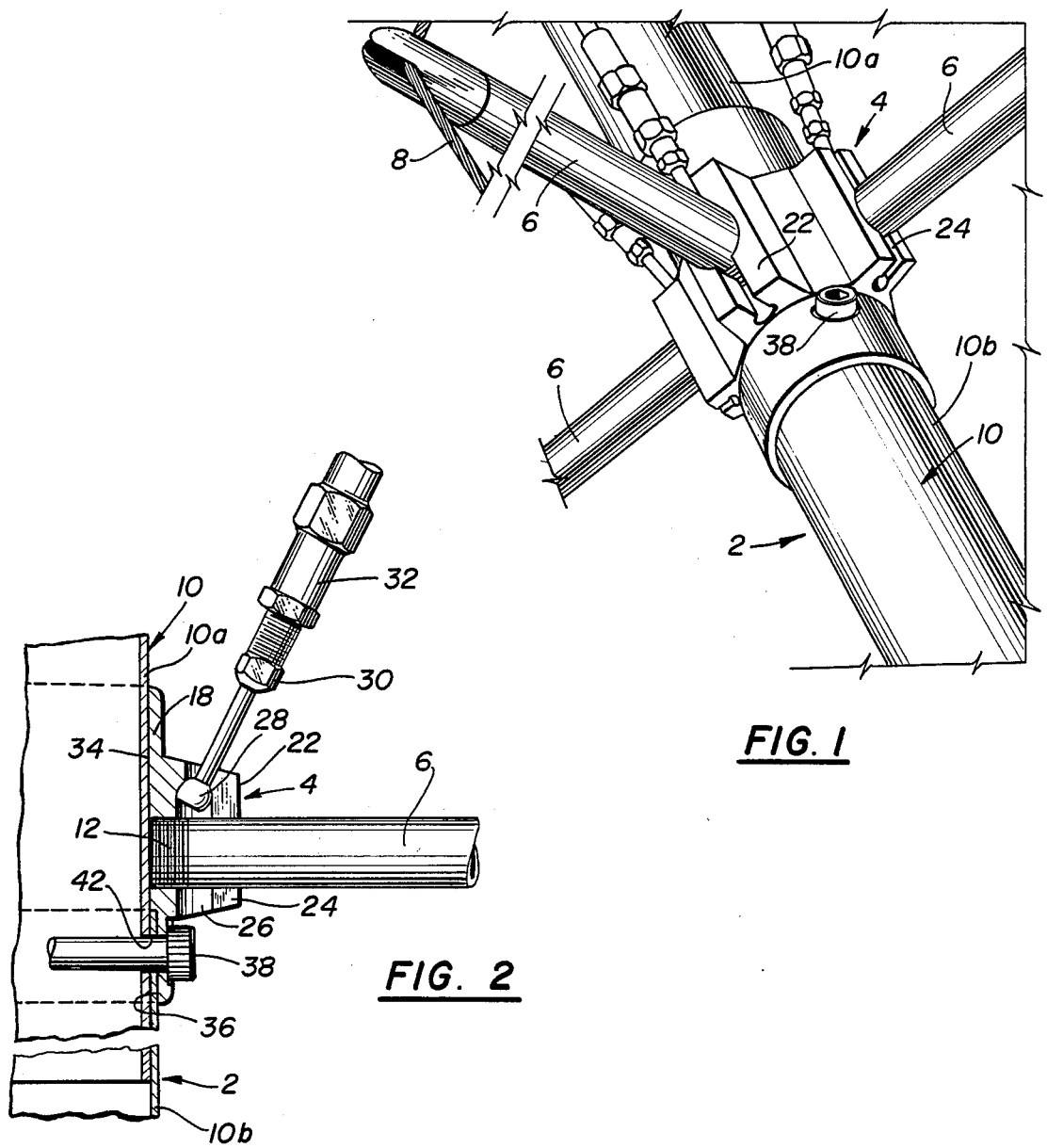
FIG. 1
FIG. 2
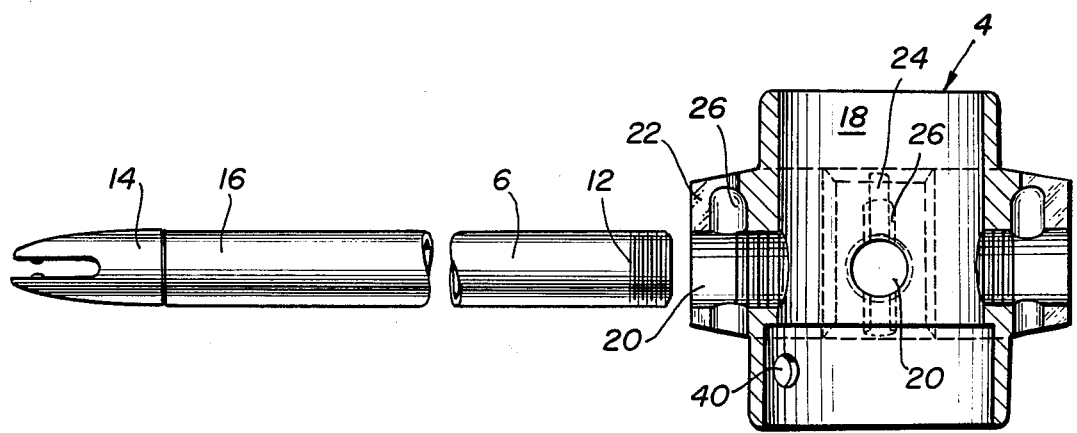
FIG. 3

SPORTFISHING OUTRIGGER DEVICES

BACKGROUND OF THE INVENTION

1. Field of the Invention

This application relates generally to outrigger devices. More particularly, it concerns novel and improved outrigger devices of the cable trussed type used on sportfishing boats.

Description of the Prior Art

Outriggers are frequently used on sportfishing boats to releasably hold a fishing line outboard of the boat. The purpose of such outrigger systems is to trail the fishing line from a position to the side of the boat and well above the water so that a number of separate baits can be trolled astern at the same time positioned in the water at laterally spaced locations. This is accomplished by running the fishing line from the fishing pole in the boat cockpit to a release clip mounted on a rigging halyard carried by the outrigger and thence astern of the boat. The release clip is arranged so that when a fish strikes the bait, the line will separate from the outrigger system and allow the angler to play the fish directly from his fishing pole in the boat cockpit.

Outrigger devices to which this invention pertains are formed of a tubular mast of modest diameter which is strengthened against bending or buckling by longitudinal cable truss systems that include spreader arms to stand off the cable from the mast to create a truss unit. Such outrigger devices are disclosed in U.S. Pat. No. 4,632,050, the contents of which are incorporated herein by reference.

OBJECTS

A principal object of the invention is the provision of improved forms of sportfishing boat outrigger devices. Further objects include the provision of:

1. New forms of cable trussed outrigger masts that are improved to protect them from appreciable damage upon inadvertent impact with pilings, bridges, docks, etc.
2. Such assemblies that permit broken spreader arms to be replaced without need to take the outrigger mast apart or to remove the spreader assembly from the mast.
3. Outrigger spreader arm units of unique construction permitting them to be made with substantial reduction in material requirements and cost of manufacture.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

This invention provides improvements in outrigger devices for sportfishing boats that have a tubular mast together with a plurality of truss cables positioned about and extending longitudinally of the mast to resist bending thereof and at least one spreader assembly carried by such mast comprising a plurality of tubular spreader arms each having an inboard end and an outboard end integral with a central body section, each said spreader arm being associated with one of the cables to forcibly stand off such cable laterally from the mast.

The objects are accomplished in accordance with the invention by the provision of improved spreader assemblies for such outrigger devices.

In the new spreader assemblies, the spreader arms are formed of metal tubing which, in a preferred embodiment of the invention, is threaded on the inboard end. In another embodiment, the inboard end may be unthreaded.

A cable guide through which one of the mast cables passes is removably fitted into each outboard end of each spreader arm.

The spreader assemblies further include a spreader arm holder that comprises a collar sized to encircle the outrigger mast. There are four bores in the collar positioned in a common transverse plane spaced 90° apart into which the inboard ends of the spreader arms extend.

A lug extends laterally from the collar at each collar bore location creating an extension of the respective bore to provide support to the inboard end of the spreader arm inserted into such bore. Each lug includes a longitudinal slot and a matching boring to admit the beaded end of the a truss cable or screwlink of a turnbuckle. Such matching boring is structured so that when such beaded end is operatively positioned therein and the spreader arm is positioned in the collar bore, the screwlink is captured in the collar.

With the new spreader assemblies constructed in this manner, an arm that may be bent or broken can be quickly replaced without requiring dismantling of other parts of the outrigger device. Further, while the assemblies utilize inexpensive, straight metal tubing for the spreader arms and a simple connection between such tubing and the assembly collar, the arrangement of the collar lugs supports the tubing when subjected to side thrusts while permitting limited flexing movement in the cable guides at the outboard ends in response to gable action. Hence, sturdy, reliable spreader assemblies are provided in accordance with the invention with substantial reduction in material requirements and production costs as compared with related devices of the prior art.

BRIEF DESCRIPTION OF THE DRAWINGS

A more complete understanding of the invention can be obtained by reference to the accompanying drawings in which:

FIG. 1 is a perspective view, partially fragmented, of a spreader assembly for outrigger devices constructed in accordance with the invention.

FIG. 2 is a fragmentary, lateral sectional view of the outrigger device of FIG. 1.

FIG. 3 is an exploded, lateral sectional view of the spreader assembly of FIG. 1.

DESCRIPTION OF THE PREFERRED EMBODIMENTS

Referring in detail to the drawings in which identical parts are identically numbered, the improved outrigger device 2 comprises a unique spreader assembly 4 having spreader arms 6 associated with cables 8 to forcibly stand off each cable 8 laterally from the mast 10.

The spreader arms 6 are formed of straight tubing threaded on their inboard ends 12. A cable guide 14, through which one of the cables 8 passes, is removably fitted into the outboard end 16 of each spreader arm 6. Advantageously, the arms 6 are made of aluminum metal and the guides 14 are injection molded plastic.

The spreader assembly 4 includes a collar 18 sized to encircle the mast 10 and four threaded bores 20 therein are positioned in a common transverse plane spaced 90° apart into which the inboard ends 12 of the spreader arms 6 are screwed. Preferably the collars 18 are machined out of aluminum metal bar stock.

A lug 22 extends laterally from the collar 18 at each collar bore 20 location creating an extension of the respective bore to provide support to the inboard end 12 of the spreader arm 8 screwed into such bore 20. Each lug 22 includes a longitudinal slot 24 and a matching boring 26 to admit the beaded end 28 of the screwlink 30 of a turnbuckle 32. Such matching boring 26 is structured so that when such beaded end 28 is operatively positioned therein and the spreader arm 6 is screwed into the collar bore 20, the screwlink 30 is captured in the respective collar lug 22.

In another embodiment of the invention (not shown), the inboard end of the the spreader arms are not threaded and they are retained in the collar by a cotter pin, bolt or equivalent fastener.

The mast 10 is formed of a plurality of tubular sections 10a and 10b telescoped together in the vicinity of the spreader assembly 4. For this purpose, the collar 18 has an upper axial bore 34 substantially equal in diameter to the outside diameter of the tubular section 10a and a lower axial bore 36 substantially equal in diameter to the outside diameter of the tubular section 10b. The sections 10a and 10b overlap (see FIG. 2) and a bolt 38 extends though opposed holes 40 in the collar 18 and matching holes 42 in the tubular sections 10a and 10b to lock them in place in the collar 18 thereby providing a rigid mast 10.

In the new outrigger devices of the invention, all parts can be disassembled. This provides advantages for both their manufacture and use. As to manufacture, such devices may be packaged "knockdown" at one location for shipment and assembly at another location. Since such shipment can be done in relatively small packages, great savings in shipping and warehousing costs are attained. Further, because of the structure of the cable guide tips 14, all of the truss cables 8 can be finished at both ends before they are installed on the masts 10 to form the complete outrigger device 2.

Also of importance to the sportfishing boat owner, repairs of damaged devices of the invention are easily made without need for major disassembly. For example, should a spreader arm 6 be broken by impact with a bridge or piling, repair is quickly accomplished. Thus, the corresponding cable 8 is relaxed by manipulation of a turnbuckle 32, the cable 8 is withdrawn from the guide tip 14, the damaged arm 6 is removed from the collar 18 and is replaced in reverse manner with a replacement spreader arm 6.

The embodiments of the invention in which an exclusive property or privilege is claimed are defined as follows:

1. In an outrigger device for sportfishing boats having a tubular mast together with a plurality of truss cables positioned about and extending longitudinally of said mast to resist bending thereof and at least one spreader assembly carried by said mast comprising a plurality of tubular spreader arms each having an inboard end and an outboard end, each said spreader arm being associated with one of said cables to forcibly stand off said cable laterally from said mast, the improvement of spreader assemblies which comprise:
   spreader arms formed of straight tubing having an inboard end and an outboard end,
   a cable guide through which one of said cables passes fitted into each said outboard end of said spreader arms, and
   a spreader arm holder that comprises:
     a collar sized to encircle said mast,
     four bores in said collar positioned in a common transverse plane spaced 90° apart into which said inboard ends of said spreader arms are inserted, and
     a lug extending laterally from the collar at each collar bore location creating an extension of the respective bore to provide support to the inboard end of the spreader arm screwed into such bore,
     each said lug including a longitudinal slot and a matching boring to admit the beaded end of a truss cable member, said matching boring being structured so that when said beaded end is operatively positioned therein and said spreader arm is positioned in said collar bore, said beaded end is captured in said collar.

2. In an outrigger device for sportfishing boats having a tubular mast together with a plurality of truss cables positioned about and extending longitudinally of said mast to resist bending thereof and at least one spreader assembly carried by said mast comprising a plurality of tubular spreader arms each having an inboard end and an outboard end, each said spreader arm being associated with one of said cables to forcibly stand off said cable laterally from said mast, the improvement of spreader assemblies which comprise:
   spreader arms formed of tubing threaded on their inboard end,
   a cable guide through which one of said cables passes fitted into each outboard end of said spreader arms, and
   a spreader arm holder that comprises:
     a collar sized to encircle said mast,
     four threaded bores in said collar positioned in a common transverse plane spaced 90° apart into which said inboard ends of said spreader arms are screwed, and
     a lug extending laterally from the collar at each collar bore location creating an extension of the respective bore to provide support to the inboard end of the spreader arm screwed into such bore,
     each said lug including a longitudinal slot and a matching boring to admit the beaded end of a screwlink of a turnbuckle, said matching boring being structured so that when said beaded end is operatively positioned therein and said spreader arm is screwed into said collar bore, said screwlink is captured in said collar.

3. An outrigger device of claim 1 wherein said spreader arms are made of metal and are of uniform diameter throughout their length.

4. An outrigger device of claim 1 wherein said mast decreases in diameter from its inboard end to its outboard end.

5. An outrigger device of claim 4 wherein said mast comprises at least first and second tubular sections, said second section having an outside diameter substantially equal to the inside diameter of said first section.

6. An outrigger device of claim 5 wherein tubular sections of said mast are telescoped together by a collar of one of said spreader assemblies.

7. An outrigger device of claim 6 wherein said collar has a first longitudinal, axial bore therein equal in diameter to the outside diameter of said first tubular section and a second longitudinal, axial bore therein equal in diameter to the outside diameter of to said second tubular section.

8. The outrigger device of claim 7 having a bolt that passes through said first axial bore, said first tubular section and said second tubular section.

* * * * *